Patented Jan. 8, 1924.

1,480,520

UNITED STATES PATENT OFFICE.

JOHN R. EOFF, JR., OF ST. LOUIS, MISSOURI, ASSIGNOR TO VITAMINE PRODUCTS COMPANY, A CORPORATION OF MISSOURI.

VITAMIN COMPOUND.

No Drawing.   Application filed July 25, 1921.  Serial No. 487,457.

*To all whom it may concern:*

Be it known that I, JOHN R. EOFF, Jr., a citizen of the United States, residing at St. Louis, in the county of St. Louis City and State of Missouri, have invented certain new and useful Improvements in Vitamin Compounds, of which the following is a full, clear, and exact specification.

This invention relates to vitamin concentrates or compounds and has for its object to produce such a compound which is high in vitamin content but low in calories or heat forming elements.

It has been pointed out by Osborn and Mendel of Yale University, and other workers with vitamins, that it would be highly advantageous to have available a vitamin containing preparation of the character mentioned. The advantage in the provision of such a vitamin concentrate or compound is due to the fact that one whose assimilation is impaired can not digest foods rich in vitamins which are also rich in calories.

After long experiment, I have determined that vitamins are present in grape juice and that these vitamins are not diminished in quantity during the process of fermentation but that any prolonged aging and sedimentation of the wine prepared by fermenting the grape juice tends to diminish the quantity of the vitamins. In the production of the vitamin concentrate or compound in accordance with the present invention, wine is used as the vehicle for the vitamin content because of the presence of vitamins in the wine, and also because it produces a preparation in palatable form.

In the normal production of wine, the clarification is assisted by the addition of gelatin, albumen, or some similar substance which combines with such ingredients of the wine as tannin to form a precipitate which gradually settles out and may be removed by filtration. In the present process, a vegetable vitamin concentrate secured from yeast or other plants or vegetables is added to new and unclarified wine so that the proteins and albuminous substances of the vatamin concentrate combine chemically with the tannin and other similar materials natural to the wine, such as enotannin, etc., said combination being retained as a component part of the mixture instead of being removed by sedimentation, filtration or otherwise. The aging and sedimentation of the wine is thus avoided and the maximum quantity of original vitamins therein retained to supplement the added vitamin concentrate.

The preferred amount of yeast or vegetable vitamin concentrate to be added to a given quantity of wine is between 3 and 4 per cent of the weight of the wine. The vitamin concentrate used may be prepared by any of the well known processes in this art, such as, by acid hydrolysis and vacuum evaporation after neutralization, or by boiling the yeast in water with subsequent evaporation of the liquid, or by acid hydrolysis and simple kettle evaporation after neutralization, or by autolyzing the yeast and evaportion of the liquid resulting therefrom. Of these processes the acid hydrolysis or the boiling with water are preferred, the solutions being evaporated to a cencentration where the vitamin concentrate is between ten and twenty times that in the yeast.

All that is necessary to obtain the chemical combination of the proteins and albuminous substances of the vitamin concentrate with the tannin and other similar materials natural to the wine is to dissolve the concentrate in the wine when almost immediately the said combination will take place. The chemical character of this combination is evidenced by the formation of a precipitate colloidal in character. As colloidal precipitates retain a certain portion of the vitamins, especially those occurring in young wine, if this precipitate is not removed by filtration or sedimentation those desirable vitamins of the young wine are retained by the preparation and not lost, as would be the case with the ordinary treatment of wine during its preparation and aging. Since the vitamins are as active when adsorbed or absorbed by the collodial material as when in solution, it will be seen that they are not removed from the preparation.

It is preferable to use a wine which is practically devoid of carbo-hydrates, that is, sugars and similar solids, in order to reduce to a minimum the percentage of calories or heat forming elements in the compound, but other types of wine may be employed with considerable success. I realize that other modifications may also be made in my invention and I do not, therefore, intend to limit myself specifically to the embodiment herein disclosed. On the other hand, I desire to protect my invention broadly in whatever form its principle may be utilized.

I claim:

1. A vitamin compound comprising a vitamin concentrate combined with the organic substances of unclarified wine.

2. A vitamin compound comprising a vitamin concentrate combined with the organic substances of unclarified wine and substantially devoid of carbo-hydrates.

3. A vitamin compound comprising wine as the vehicle for a vitamin concentrate and in which the tannin is combined with said vitamin concentrate.

4. A vitamin compound comprising wine as the vehicle for a vitamin concentrate and in which the tannin is combined with said vitamin concentrate, said compound being substantially devoid of carbo-hydrates.

5. A process of preparing a vitamin compound which consists in first fermenting grape juice to produce unclarified wine, and then combining therewith a vitamin concentrate, the tannin and other similar materials natural to the wine combining chemically with said vitamin concentrate and being retained in the compound.

In testimony whereof I have signed my name to this specification.

JOHN R. EOFF, Jr.